Patented Feb. 21, 1939

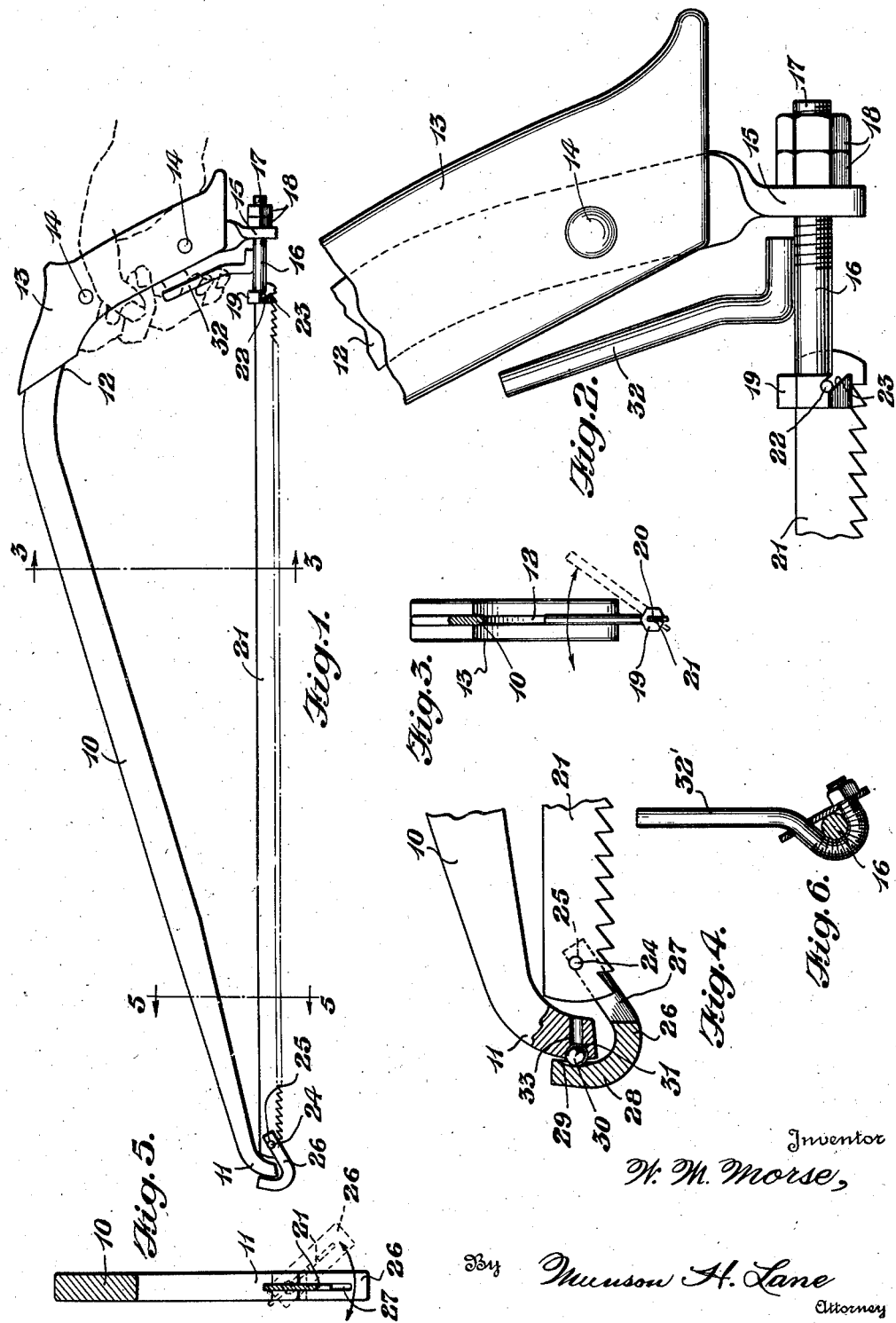

2,147,986

UNITED STATES PATENT OFFICE 2,147,986

PRUNING SAW

Wilson M. Morse, Waterford, Maine

Application July 13, 1938, Serial No. 219,040

5 Claims. (Cl. 30—166)

The invention relates to saws and more particularly to pruning saws and the object of the invention is to provide means whereby the angle of the blade with reference to the frame may be readily adjusted by the operator while the saw is in use.

According to my invention the blade may be angled with the fingers of the hand holding the saw and this one operation angles the entire blade without twisting, whereas with pruning saws now on the market a separate operation is required to angle each end of the saw and these operations required the use of both hands, one to hold the frame and the other to make the necessary adjustment of the blade. The angling of the saw with one hand is a great convenience as in doing a good job of pruning it is essential to saw off branches close to the limb from which they are being removed. With the variations in limb construction or growth it is necessary to change the angle of the blade for nearly every limb sawed.

The invention will be more readily understood by reference to the accompanying drawing and the following detailed description which are intended as illustrative of the inventive thought rather than as limiting the invention to the exact details set forth.

In the drawing:

Fig. 1 is a side elevation of a pruning saw embodying my invention.

Fig. 2 is an enlarged detail of the rear end thereof showing the mounting of the rear of the saw blade and also the adjusting lever.

Fig. 3 is a section taken on line 3—3 of Fig. 1, the dotted lines indicating an angular adjustment and the arrows indicating the direction of movement of the saw blade to either side of the vertical position.

Fig. 4 is a detail showing the front end mounting.

Fig. 5 is a view taken on line 5—5 of Fig. 1.

Fig. 6 is a detail view showing a modified form of operating lever.

Referring to the drawing in detail, the reference numeral 10 indicates the frame member which may be of wrought iron or any suitable material, the frame including a straight portion and a portion bent down at the front at 11 to aid in mounting the saw blade and a portion bent downwardly at the rear at 12 to permit the mounting of a handle 13, which may be of wood or the like and may be secured to the rear end 12 by suitable fastening means 14, 14. The lower portion of the rear end 12 is shown as twisted at right angles at 15, the twisted portion having an opening therein through which passes an adjusting bolt 16 shown as threaded at 17 and provided with nuts 18, 18 at the end thereof to secure the bolt in place.

The bolt is shown as provided with a head 19 having a saw-cut 20 in the front face thereof which cut extends through the head and a short distance through the shank of the bolt, to permit mounting of the rear end of the saw blade 21. This blade is shown as provided with a pin 22 which extends transversely through an opening near the rear end thereof, the extensions of which pin fit in a groove 23 formed in the rear face of the bolt head 19.

The front end of the saw blade is so mounted as to permit angular movement applied to the rear end of the saw to be transmitted, without strain and without twisting, to the front end. As shown the front end of the saw is provided with a transverse pin 24 similar to the pin 22 at the rear end, the lateral extensions of which fit into a groove 25 formed in a connecting member or tip 26 shown as bent into substantially J-shape. This connecting member may be made of wrought iron or any suitable material and as shown is provided with a saw-cut 27 to accommodate the front end of the saw blade, the mounting of the front end of the saw blade being similar to the mounting of the rear end in the head of the bolt 16 as previously described. The front end 28 of the connecting member 26 is bent upwardly and is provided with a recess or socket 29 against which engages a ball member 30 projecting outwardly from the downturned portion 11 at the front end of the frame. The ball may be suitably secured in place in a seat 31 in the front face of the projection 11 or may be loosely mounted and held by the tension of the saw blade when the nuts 18, 18 are tightened. However, it is generally desirable that the ball should be held securely so that it will not be dropped out and be lost when the saw is being assembled. As shown the front end 11 of the saw frame is drilled just enough to seat the steel ball slightly more than half its diameter and by prick punching the ball 30 is held securely in the frame.

An important feature of the invention resides in the fact that the cavity 29 in the movable tip 26 is in the form of a portion of a sphere whose diameter is somewhat larger than the diameter of the ball. This construction allows the movable tip to contact the ball at only a single point thus reducing friction and permitting the saw blade to be easily angled by suitable operating means at the rear end of the blade. According to the present construction the movable tip pivots so easily on the ball that changing the angle of the blade results in an equal angling of the blade throughout its entire length. While the socket 29 is preferably of larger diameter than that of the ball it is obviously within the scope of the invention to have the ball and socket of substantially the same diameter.

From the type of mounting of the blade at the front and rear, previously described, it is obvious that the blade may be swung angularly in either direction from the vertical as indicated by the arrows in Figs. 3 and 5. The mounting at the front end is substantially frictionless owing to the ball and socket connection while the mounting at the rear end involves a sufficient amount of friction to hold the blade in any adjusted position.

As the saw is designed to be used for pruning purposes it is desirable that the blade be adjustable by the same hand which holds the saw as the other hand of the operator may be otherwise employed. For this purpose an operating lever 32 is provided in a position to be grasped by the fingers of the same hand which is gripping the saw handle 13, as indicated in Fig. 1. This lever may be secured to the bolt 16 in any suitable manner as by welding, this form being indicated in Figs. 1 to 5 while in the modification shown in Fig. 6 the lever 32' is adapted to be clamped to the bolt 16.

The operation of the device will be apparent from the foregoing description. The operator grasps the saw by the handle 13 with the fingers of his hand including the lever 32 therein. When it is desired to shift the angle of the blade as is often necessary in order to saw close to a limb this can be done with the same hand which is gripping the saw. It will be obvious that the single movement of the lever 32 is transmitted along the entire blade without any twisting of the blade intermediate its ends, this being possible owing to the frictionless mounting of the front end of the saw. To remove the blade the bolts 18, 18 are loosened thus permitting the ends of the blade to be withdrawn from the grooves in the bolts 16 and in the connecting tip 26. It will be obvious that when the ball 30 becomes worn it may be readily removed by forcing an instrument through the opening 33 extending through the down-turned tip 11. The worn ball may then be replaced by another. However, in practice it is found that very little wear takes place and a single ball may be used indefinitely.

It will be understood that while the saw embodying the present invention has been described with particular reference to its use for pruning purposes it may obviously be used for any desired purpose without departing from the spirit of the invention.

I claim:

1. In a pruning saw having a frame provided with a handle portion at the rear thereof, and a saw blade swivelly mounted at each end in the frame; the improvement which comprises a single lever for rotating said blade rigidly connected to said blade intermediate the end mountings and adjacent to the blade handle the front end mounting being substantially frictionless, whereby the operator may operate the saw and adjust the angle of the blade with the same hand.

2. A pruning saw comprising a frame having down turned ends, a handle portion at the rear end thereof, a saw blade mounted in said frame for angular adjustment, an adjustable connection between the blade and frame at the handle end of the saw including means for applying tension to the blade, and a substantially frictionless connection between the saw and blade at the end of the saw opposite to the handle including a tip having an upturned end projecting over the outer portion of the end of the frame, cavities in said end portion and frame respectively providing a ball seat, and a ball in said seat.

3. In a pruning saw, a rigid frame having down turned ends, a handle portion at the rear end thereof, and a saw blade so mounted in said frame as to permit angular adjustment, said saw blade having a connection to the frame at the rear end possessing sufficient friction to hold the blade in any adjusted position, a single adjusting means also located adjacent the rear portion of the saw blade and accessible to the fingers of an operator while gripping the handle portion, and an anti-friction connection at the front end of the saw.

4. In a pruning saw, a rigid frame having down turned ends, a handle portion at the rear end thereof, and a saw blade so mounted in said frame as to permit angular adjustment, said saw blade having a connection to the frame at the rear end possessing sufficient friction to hold the blade in any adjusted position, adjusting means also located adjacent the rear portion of the saw blade and accessible to the fingers of an operator while gripping the handle portion, and an anti-friction connection at the front end of the saw, said anti-friction connection including a tip portion secured to the saw having an upturned end or extension projecting over the end of the frame, cavities in said end portion and frame respectively providing a ball seat, and a ball within said seat.

5. In a pruning saw, a rigid frame having down turned ends, a handle portion at the rear end thereof, and a saw blade so mounted in said frame as to permit angular adjustment, said saw blade having a connection to the frame at the rear end possessing sufficient friction to hold the blade in any adjusted position, adjusting means also located adjacent the rear portion of the saw blade and accessible to the fingers of an operator while gripping the handle portion, an anti-friction connection at the front end of the saw, said anti-friction connection including a tip portion secured to the saw having an upturned end or extension projecting over the end of the frame, cavities in said end portion and frame respectively providing a ball seat, and a ball within said seat, the cavity in said tip extension being of greater radius than that of the ball whereby the ball contacts the tip at a single point only.

WILSON M. MORSE.